United States Patent [19]

Heckt

[11] Patent Number: 5,003,491

[45] Date of Patent: Mar. 26, 1991

[54] MULTIPLYING VIDEO MIXER SYSTEM

[75] Inventor: Neil W. Heckt, Bellevue, Wash.

[73] Assignee: The Boeing Company, Seattle, Wash.

[21] Appl. No.: 166,424

[22] Filed: Mar. 10, 1988

[51] Int. Cl.[5] .............................................. G06F 3/153

[52] U.S. Cl. .................................... 364/518; 364/521; 358/22; 358/81; 340/703

[58] Field of Search .................. 364/518, 521; 358/22, 358/81; 340/703, 728, 706

[56] References Cited

U.S. PATENT DOCUMENTS

| | | | |
|---|---|---|---|
| 4,149,184 | 4/1979 | Giddings et al. | 358/81 |
| 4,183,046 | 1/1980 | Dalke et al. | 358/22 |
| 4,209,832 | 6/1980 | Gilham et al. | 364/521 |
| 4,317,114 | 2/1982 | Walker | 340/721 |
| 4,392,156 | 7/1983 | Duca et al. | 358/183 |
| 4,533,937 | 8/1985 | Yamamoto et al. | 358/22 |
| 4,591,897 | 5/1986 | Edelson | 358/22 |
| 4,599,610 | 7/1986 | Lacy | 340/721 |
| 4,602,286 | 7/1986 | Kellar et al. | 358/183 |
| 4,672,558 | 6/1987 | Becker et al. | 364/518 |
| 4,699,501 | 10/1987 | Watanabe et al. | 355/14 R |
| 4,716,542 | 12/1987 | Peltz et al. | 364/900 |

*Primary Examiner*—Gary V. Harkcom
*Assistant Examiner*—Phu K. Nguyen
*Attorney, Agent, or Firm*—Finnegan, Henderson, Farabow, Garrett & Dunner

[57] ABSTRACT

A multiplying video mixer system including a digital signal generator for generating at least one overlay signal and an attribute control bit corresponding to each of a plurality of pixels. A background signal generator generates input background signals to which the attribute control bits are applied to effect the input background signals with a desired opaque/transparent attribute. At least one video multiplier multiplies the overlay attribute signals and background signals to produce an output video signal having an amplitude equal to the product of the amplitudes of the overlay and background signals.

4 Claims, 4 Drawing Sheets

Fig. 2
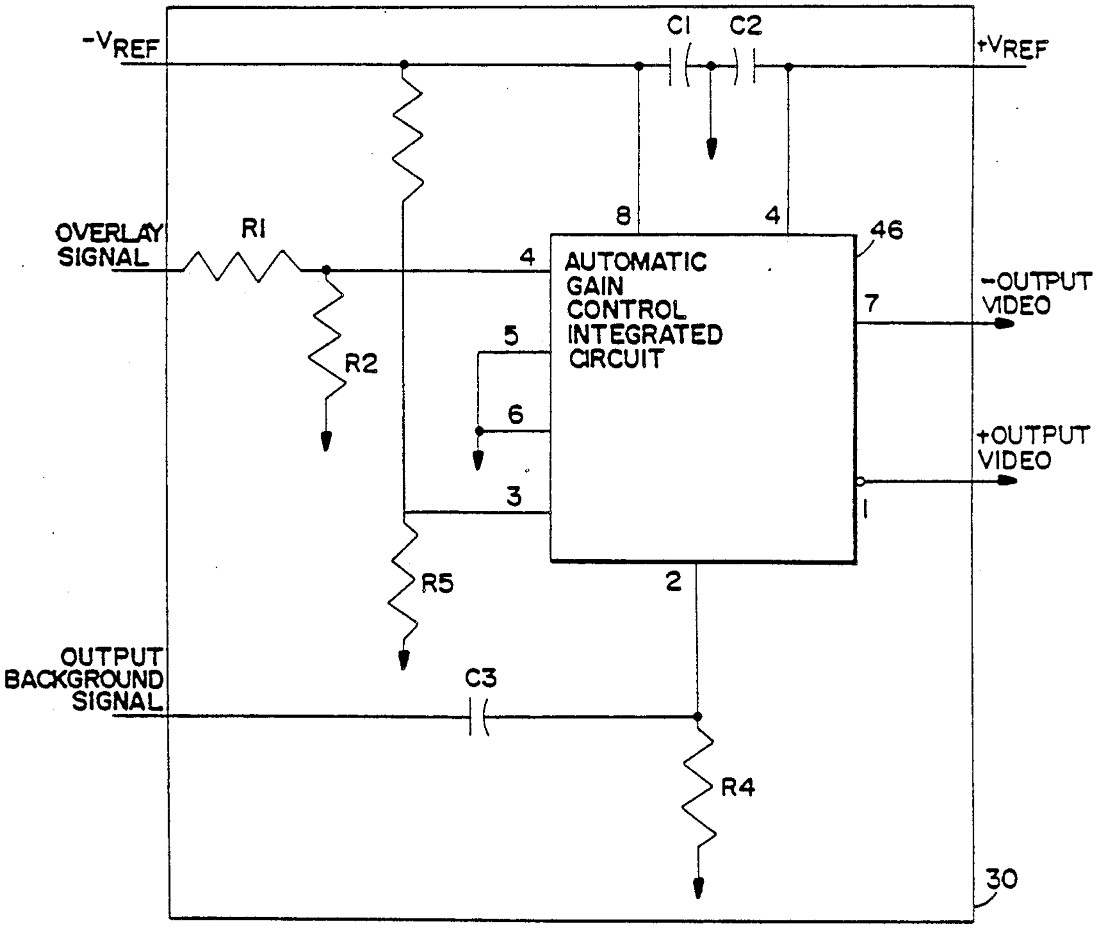
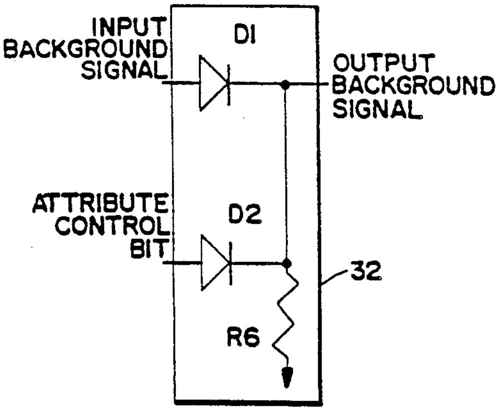
Fig. 3
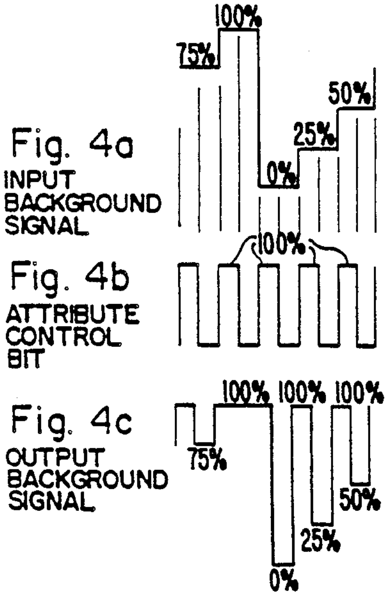

INPUT BACKGROUND SIGNAL

ATTRIBUTE CONTROL BIT

OUTPUT BACKGROUND SIGNAL

OVERLAY SIGNAL

OUTPUT VIDEO SIGNAL

MULTIPLYING VIDEO MIXER SYSTEM

BACKGROUND OF THE INVENTION

1. Field of the Invention

The invention described herein was made in the performance of work under NASA Contract No. JPL 957096 and is subject to the provisions of Section 305 of the National Aeronautics and Space Act of 1958 (72 Stat. 435; 42 U.S.C. 2457).

The present invention relates to a multiplying video mixer system, in general, and specifically relates to a system whereby individual color background and overlay signals can be multiplied to generate a composite video signal for use in a computer graphics system display.

2. Description of Related Art

Heretofore, several devices for displaying overlay signals and background signals on a video display have been known. However, each suffers from various disadvantages. For example, it has been proposed to provide a system wherein one display generator provides an overlay signal, and another display generator provides a background video signal and either the background signal, the overlay signal, or the sum of the signals is displayed.

Other systems attempt to achieve smooth background signals representing both opaque and transparent objects. An opacity weighting factor representing the degree of desired opacity of the background signal is multiplied by a video color brightness value and the complement of the weighting value is multiplied by the brightness of the overlay signal. The two products are added together to produce video signals in the transition between the background and overlay images.

Still other systems attempt to smooth the transition from one video source to another by superimposing one video source on another in an opaque manner.

None of the video color graphics systems known in the art, however, are capable of multiplying an overlay signal and an input background signal to generate a composite video signal. Additionally, such systems fail to permit an opaque/transparent attribute control bit to be applied to the input background signal to control the opacity and transparency of the background signals.

SUMMARY OF THE INVENTION

Accordingly, it is an object of the invention to provide a color multiplying video mixer system wherein either an opaque or transparent input overlay signal can be multiplied with a background signal to generate a composite video signal.

It is a further object of the invention to provide a multiplying video mixer system which permits an operator to modify the respective background and overlay signals in selected areas of a display.

It is still another object of the invention to provide a multiplying video mixer system capable of permitting the tinting of areas of the background as a field attribute without obscuring the detail of the background image.

Other objects and features of the invention will further become apparent with reference to the accompanying drawings and detailed description of the invention.

To achieve the foregoing objects and in accordance with the purpose of the invention, as embodied and broadly described herein, the multiplying video mixer system of the present invention comprises a background signal generator for generating an input background signal for each of a plurality of pixels; a digital signal generator for generating a digital word corresponding to each pixel, each digital word including at least one overlay control bit for controlling an overlay image to be displayed at the pixel and at least one attribute control bit for controlling an opaque/transparent attribute of the input background signal, a digital-to-analog converter for converting the overlay control bits into an analog overlay signal; a transmission gate for applying the attribute control bit to a corresponding input background signal having the opaque/transparent attribute of the attribute control bit; and a video multiplier for multiplying the overlay signal and the output background signal to generate an output video signal. Although the attribute control bit is applied to an input background signal, the result is the generation of either an opaque or transparent overlay.

BRIEF DESCRIPTION OF THE DRAWINGS

The accompanying drawings, which are incorporated in and constitute a part of this specification, illustrate an embodiment of the invention, and, together with the description, serve to explain the principles of the invention.

Of the drawings:

FIG. 2 is a more detailed diagram of a video multiplier used in the system of FIG. 1;

FIG. 3 is a more detailed diagram of a transmission gate used in the system of FIG. 1;

Figure 1:
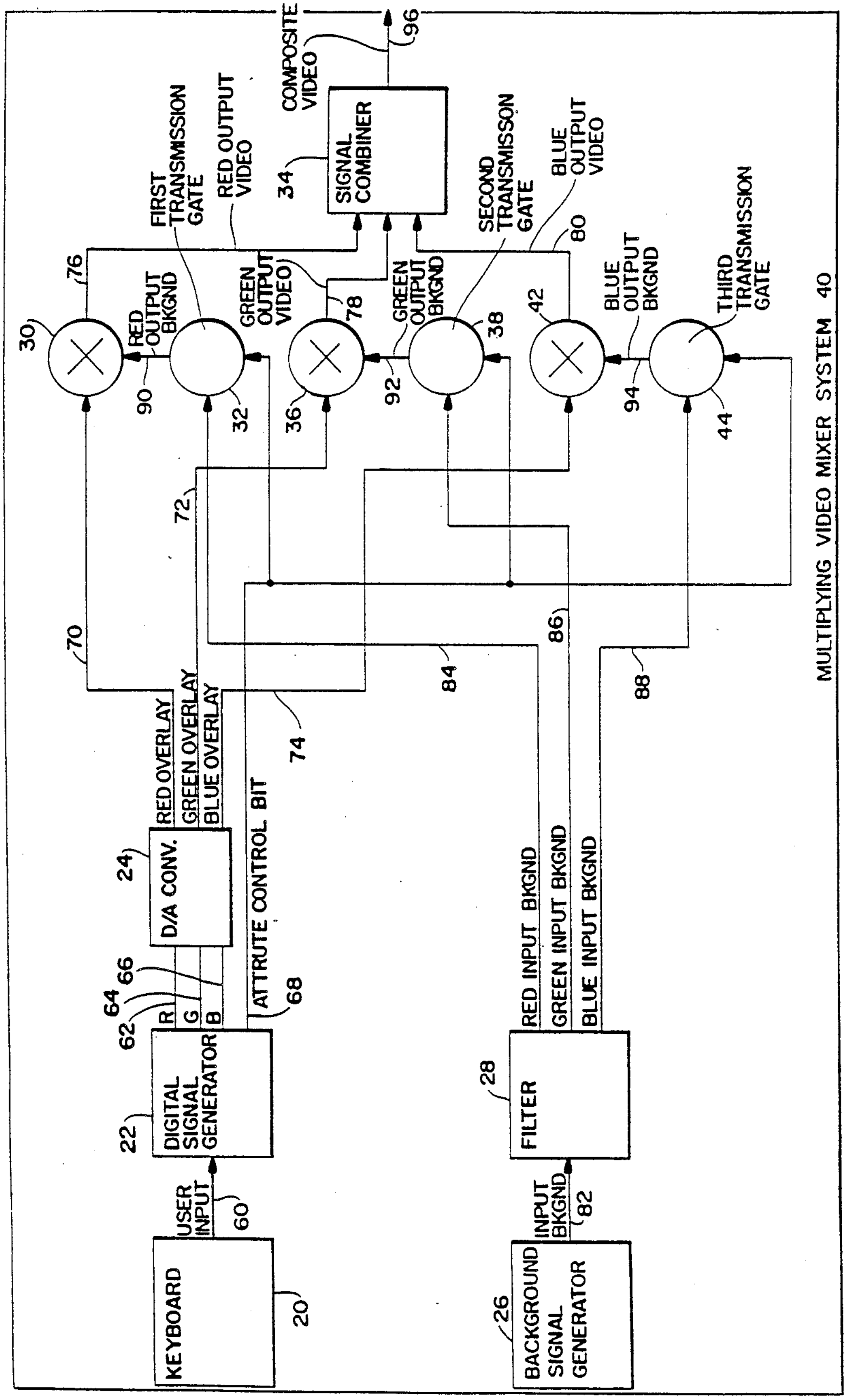
FIG. 1 is a schematic block diagram illustrating a preferred embodiment of a multiplying video mixer system for multiplying video signals in accordance with the present invention.

FIGS. *4a–4c* are timing diagrams illustrating an example of the operation of the transmission gate of FIG. 3;

FIGS. *5a–5e* are timing diagrams illustrating an example of the operation of the system of FIG. 1; and FIGS. *6a–6d* illustrate sample applications executed by the system of FIG. 1.

DESCRIPTION OF THE PREFERRED EMBODIMENT

Reference will now be made in detail to the present preferred embodiment of the invention, an example of which is illustrated in the accompanying drawings.

Illustrated in FIG. 1 is a preferred embodiment of a multiplying video mixer system 40 of the invention. Multiplying video mixer system 40 includes a keyboard 20, a digital signal generator 22, a digital-to-analog (D/A) converter 24, a background signal generator 26, a filter 28, first, second, and third video multipliers 30, 36, 42, first, second, and third transmission gates 32, 38, 44, and a signal combiner 34.

User inputs are passed from the output of keyboard 20 over line 60 to the input of digital signal generator 22. Digital signal generator 22 generates a digital word comprising at least one overlay control bit for controlling an overlay image and at least one attribute control bit for controlling an opaque/transparent attribute of an overlay signal. FIG. 1 illustrates an embodiment wherein the digital word includes red, green, and blue overlay control bits which are passed from the output of digital signal generator to D/A converter 24 over lines 62, 64, and 66, respectively. The digital word output from digital signal generator 22 further includes at least one attribute control bit which is passed from the output of digital signal generator 22 over line 68 to inputs of first, second, and third transmission gates 32, 38 and 44. D/A converter 24 receives the red, green, and blue overlay control bits and converts the bits into analog red, green, and blue overlay signals. The red overlay signal is passed over line 70 to first video multiplier 30, green overlay signal is output from D/A converter 24 over line 72 to second video multiplier 36 and blue overlay signal is passed over line 74 to third video multiplier 42.

Background signal generator 26 generates an input background signal onto which overlay signals may be imposed by a user as desired which is passed over line 82 to filter 28. Filter 28 filters the input background signal into red, green, and blue input background signals. Red input background signal is passed from an output of filter 28 over line 84 to an input of first transmission gate 32, the green input background signal is passed from an output of filter 28 over line 86 to an input of second transmission gate 38, and blue input background signal is passed transmission gate 44. Filter 28 may be omitted if background signal generator directly outputs red, green, and blue input background signals.

A red output background signal is passed from the output of first transmission gate 32 to the input of first video multiplier 30 over line 90, a green output background signal is passed from the output of second transmission gate 38 to the input of second video multiplier 36 over line 92, and a blue output background signal is passed from the output of third transmission gate 44 to the input of third video multiplier 42 over line 94.

A red output video signal is passed from the output of first video multiplier 30 to the input of signal combiner 34 over line 76, a green output signal is passed from the output of second video multiplier 36 to an input of signal combiner 34 over line 78, and a blue output signal is passed from the output of third video multiplier 42 to an input of signal combiner 34 over line 80. Output from signal combiner 34 is a composite video signal passed over line 96 to a color monitor or the like (not shown). Optionally, signal combiner 34 may be omitted if the monitor can directly receive the red, green, and blue output signals.

The operation of multiplying video mixer system 40 illustrated in FIG. 1 will now be more fully explained. A user of system 40, through keyboard 20 or the like, inputs certain user inputs reflecting desired overlay display characteristics. The user inputs are passed to digital signal generator 22 which generates a plurality of digital words, each of which includes at least one overlay control bit for controlling an overlay image and at least one attribute control bit for controlling an opaque/transparent attribute of the input overlay signal. Such bits could be combined in, for example, a ten bit word wherein three bits represent red overlay control bits, three bits represent green overlay control bits, three bits represent blue overlay control bits, and one bit represents the attribute control bit. Such a digital word is generated for each pixel in the display. For example, let it be assumed that the display of the monitor comprises an array of 10×10 pixels. The output of digital signal generator 22, therefore, would consist of an array of 100 digital words, each comprising 10 bits, as described above. Thus, the overlay control characteristics and opaque/transparent attribute of each pixel to be displayed on the monitor are represented in the array of digital words output from digital signal generator 22. The red, green, and blue overlay control bits output from digital signal generator 22 are passed to D/A converter 24, resulting in analog red, green, and blue overlay signals. The digital attribute control bit is output from digital signal generator 22 directly to the inputs of first, second and third transmission gates 32, 38, 44, respectively.

Also input into the first, second, and third transmission gates are red, green, and blue input background signals, respectively, output from filter 28. These input background signals represent the red, green, and blue components of the input background signal generated by background signal generator 26. First, second, and third transmission gates 32, 38, 44 each receive the respective input background signals and the attribute control bit and detect the state of the attribute control bit, i.e., detects whether attribute control bit is a 1, thereby indicating that an opaque background attribute is desired, or is a 0, thereby indicating that a transparent background attribute is desired.

It should be noted that although the attribute control bit is applied an input background signal, the result is either an opaque or transparent overlay.

If attribute control bit is a 1, then the respective input background signal applied to that transmission gate is passed through the transmission gate at full scale. That is, regardless of the amplitude of the input background signal, if the attribute control bit indicates that an opaque background attribute is desired, the intensity of the input background signal is increased to full scale. If the attribute control bit is a 0, thus indicating that a transparent background attribute is desired, then the input background signal applied to the transmission gate is passed through the transmission gate unaffected. The structure and function of transmission gates 32, 38, 44 will be discussed in more detail below in connection with FIGS. 3 and 4.

Red, green, and blue output background signals are output from transmission gates 32, 38, 44 to inputs of first, second, and third video multipliers 30, 36, 42, respectively. Also input to first, second, and third video multipliers 30, 36, 42 are red, green, and blue overlay signals from D/A converter 24. Each video multiplier multiplies the respective overlay and output background signals input to the video multiplier and outputs the product of the overlay and output background signals as an output video signal. Red green, and blue output video signals thus generated are passed from first, second, and third video multipliers 30, 36, 42 to inputs of signal combiner 34. Signal combiner 34 then combines the respective output video signals into a single analog composite video signal which may be passed to a monitor or the like (not shown).

A preferred embodiment of a video multiplier used in multiplying video mixer system 40 will now be described in connection with FIG. 2. Because the structure and function of first, second and third video multipliers 30, 36, 42 are identical, FIG. 2 illustrates only a preferred embodiment of first video multiplier 30.

As shown in FIG. 2, video multiplier 30 includes an automatic gain control integrated circuit 46, resistors R1, R2, R3, R4, and R5, and capacitors C1, C2, and C3.

An overlay signal from D/A converter 24 is input on line 70 to video multiplier 30 through resistor R1 to pin 4 of integrated circuit 46. Resistor R2 is connected at one end between resistor R1 and pin 4 of integrated circuit 46 and grounded at its other end. Together resistors R1, R2 function as a voltage divider. An output background signal on line 90 is applied to pin 2 of integrated circuit 46 through capacitor C3. Resistor R4 has one end provided between capacitor C3 and pin 2 of integrated circuit 46 and is grounded at its other end. Positive and negative bias reference voltages, $+V_{REF}$, $-V_{REF}$ are provided to capacitors C2, C1, respectively. The other ends of capacitors C2, C1 are connected to ground. $+V_{REF}$ and $-V_{REF}$ are also connected to pin 4 and pin 8 of integrated circuit 46, respectively. $-V_{REF}$ is further connected to pin 3 of integrated circuit 46 through resistor R3. Resistor R5 has one end provided between resistor R3 and pin 3 of integrated circuit 46 and is grounded at its other end. Resistors R3, R5 also function as a voltage divider. Pins 5 and 6 of integrated circuit 46 are both connected to ground. Pin 1 of integrated circuit 46 provides a positive output video signal and pin 7 is the complement of pin 1, thus providing a negative output video signal.

Automatic gain control integrated circuit 46 may comprise any of a plurality of multiplying integrated circuits, such as, for example, an MC1445/1545 integrated circuit. Resistors R1, R2, R3, R4, and R5 may have, for example, values of 52 ohms, 22 ohms, 1500 ohms, 3600 ohms, and 52 ohms, respectively. Capacitors C1, C2, and C3 may have, for example, the values of 0.1 F, 0.1 F, and 10 mF.

FIG. 3 illustrates a preferred embodiment of a transmission gate used in multiplying video mixer system 40. Because the structure and function of transmission gates 32, 38, 44 are identical, only transmission gate 32 is illustrated in the figure.

Transmission gate 32 includes diodes, D1, D2 and resistor R6. An input background signal from filter 28 is applied on line 84 to the anode of diode D1. The cathode of diode D1 is connected via line 90 to a video multiplier (e.g., video multiplier 30) and to resistor R6. The attribute control bit output from digital signal generator 22 is passed via line 68 to the anode of diode D2 which has its cathode also connected to line 90 and to resistor R6. Resistor R6 is connected at its other end to ground.

As described above, if the attribute control bit is a 1, indicating that the user desires an opaque background attribute, then the two inputs applied to diodes D1, D2 add across resistor R6 in transmission gate 32. This causes an increase in the amplitude of the input background signal to full scale and outputs a full scale signal as the output background signal on line 90. If the attribute control bit is a 0, indicating that the user desires a transparent background attribute, then the output background signal will be the same as the input background signal.

FIGS. **4*a*–4*c* illustrate timing diagrams describing the function of first, second, and third transmission gates 32, 38, 44**. As shown in the figures, when the attribute control bit is a 1, represented by a value of 100%, then output background signal also has a value of 100%. If attribute control bit is a 0, indicating that the user desires a transparent background attribute, then the output background signal is the same as the input background signal.

Figure 5A:
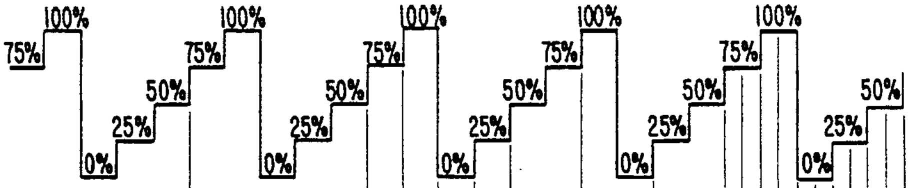
Figure 5B:
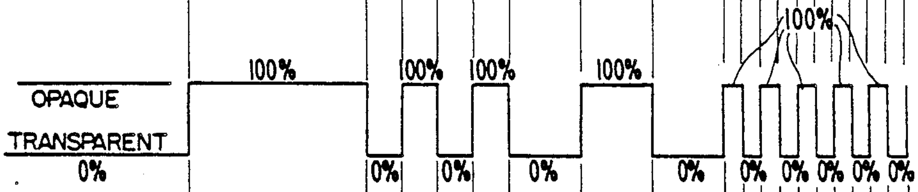
Figure 5C:
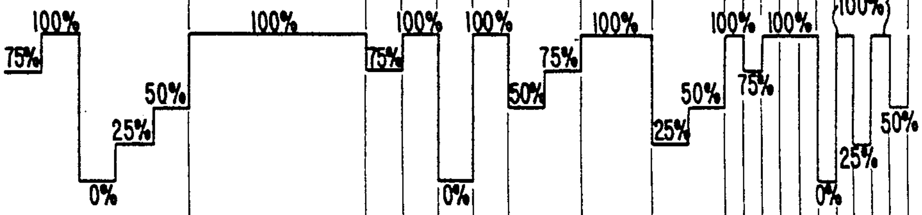
Figure 5D:
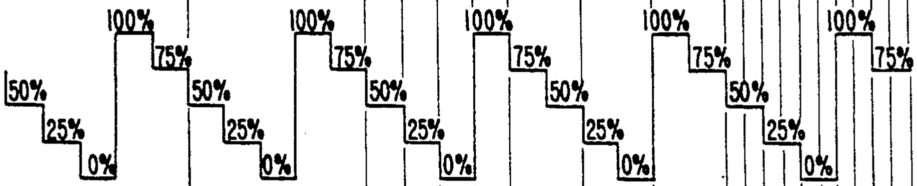
Figure 5E:
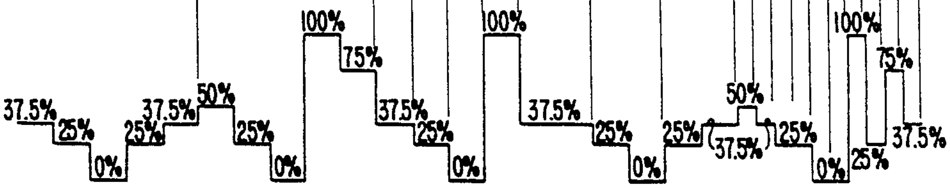
Figure 6A:
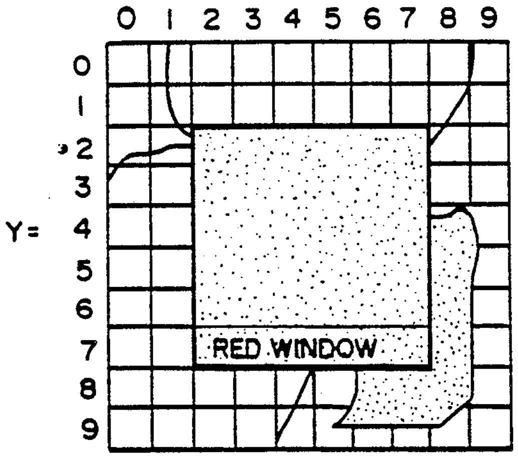
Figure 6B:
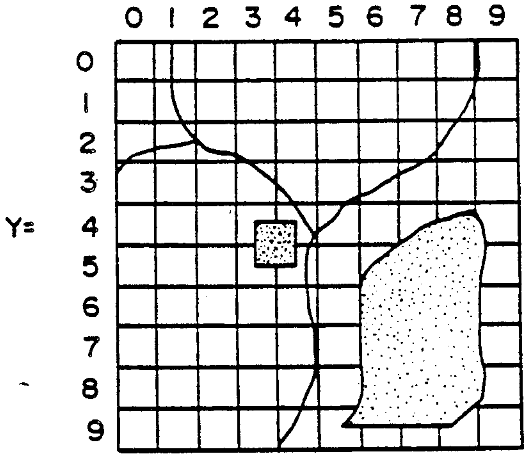
Figure 6C:
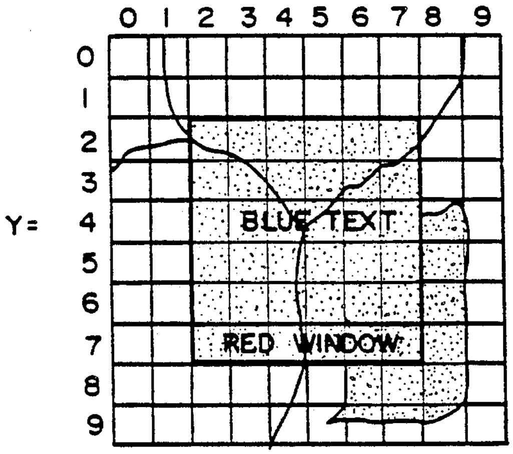
Figure 6D:
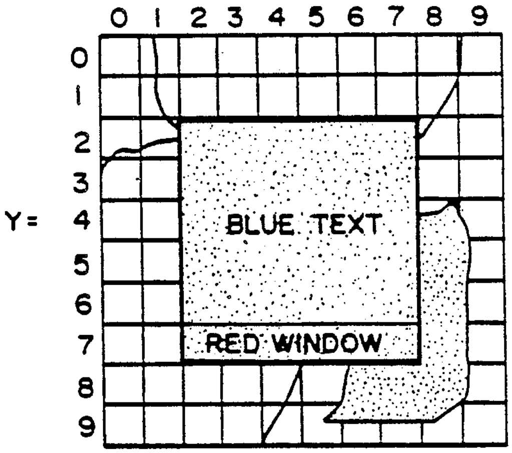

FIGS. **5*a*–5*e* are timing diagrams illustrating the operation of multiplying video mixer system 40. As shown therein, the attribute control bit is applied to the input background signal by a transmission gate, resulting in an output background signal, as described above in connection with FIGS. 3 and 4*a*–4*c*. An analog overlay signal output from D/A converter 24 is illustrated by the waveform of FIG. 5*d*. FIG. 5*e* shows the output video signal from a video multiplier, i.e., the product of the output background signal illustrated in FIG. 5*c* and the overlay signal illustrated in FIG. 5*d*. Red, green, and blue output video signals are output from first, second, and third video multipliers 30, 36, 38 and are passed to inputs of signal combiner 34 which combines the respective red, green, and blue signals into a composite video signal which can be passed to a monitor or the like over line 96**.

The multiplying video mixer system described above in connection with FIGS. 1–5 generates composite video signals for display on a color monitor. Accordingly, three pairs of video multipliers and transmission gates are required, namely, one pair for each of the primary color components, red, green, and blue, of the composite video signal.

The multiplying video mixer system of the present invention, however, is not limited to use with a color monitor. If a black and white monitor is used then only one video multiplier and transmission gate are required. Additionally, digital signal generator 22 would generate only at least one overlay control bit and at least one attribute control bit. Moreover, filter 28 would not be required and the input background signal from background signal generator 26 would be passed directly to the transmission gate. Signal combiner 34 would likewise no longer be required and thus the output video signal from the video multiplier could be passed directly to the monitor.

The use of three separate pairs of video multipliers and transmission gates, however, results in the present multiplying video mixer system having several desirable advantages over devices previously known in the art. To appreciate these advantages and the flexibility afforded the user by the claimed multiplying video mixer system, specific examples of how the amplitudes of both the overlay signals and input background signals may be varied to achieve desired composite video signals will now be discussed. For the purposes of illustration, let:

| | |
|---|---|
| Ro = | Red overlay signal amplitude; |
| Go = | Green overlay signal amplitude; |
| Bo = | Blue overlay signal amplitude; |
| Rb = | Red input background signal amplitude; |
| Gb = | Green input background signal amplitude; |
| Bb = | Blue input background signal amplitude; |
| RED = | Red output video signal amplitude; (RED = Ro × Rb); |
| GREEN = | Green output video signal amplitude; (GREEN = Go × Gb); and |
| BLUE = | Blue output video signal amplitude; (BLUE = Bo × Bb). |

It is often desirable to selectively conceal or expose various areas of a display depending on specific types of information to be presented. To achieve this result using the multiplying video mixer system of the present invention, let Ro=Go=Bo=0 at pixels desired to be blacked-out. The resultant output video signals, RED, GREEN and BLUE will all therefore equal zero for those pixels on the display (since zero multiplied times any value equals zero), resulting in a black display at those pixels regardless of the input background signal values. Because the amplitudes of the overlay signals input into the video mulltipliers are all zero, either an opaque or transparent attribute control bit could be fed to transmission gates 32, 38, 44 without affecting the amplitude of the output video signals, RED, GREEN and BLUE.

If Ro=Go=Bo=K, where 0K 1.0, and an opaque attribute control bit is fed to transmission gates 32, 38, 44, the resultant output video signals RED, GREEN and BLUE would each have an amplitude of K. This result occurs since the opaque attribute control bit causes the amplitudes of the input background signals Rb, Gb and Bb to go to full scale. .Thought of as an analog signal, these signals would each assume a value of 100% when opaque is commanded. As a result, the output video signals RED, GREEN and BLUE would each have the same amplitude as the respective overlay signal amplitude multiplied by a factor of 1.0, thereby resulting in the output video signal amplitudes being equal to the respective overlay signal amplitudes The resultant output, RED=GREEN=BLUE=K, results in a gray display overlay, useful for fine graphical data or text overlay on the background.

When it is desired to control the contrast between background and overlay images, letting Ro=Go=Bo=K and feeding a transparent attribute control bit to transmission gates 32, 38, 44 results in the amplitude of the input background signals being reduced in proportion to the amplitude of the overlay signals, K. Specifically, RED=K×Rb, GREEN=K×Gb and BLUE=K×Bb.

If Ro=K1, Go=K2 and Bo=K3 and an opaque attribute control bit is fed to transmission gates 32, 38, 44, the result is a color overlay useful for displaying fine color graphical or textual overlays on the background of the graphics display. The amplitudes of the resulting output signals, RED, GREEN and BLUE would be equal to the amplitudes of the input overlay signals Since an opaque attribute control bit was commanded, the amplitudes of the input background signals are driven to full scale. Thus, Rb=Gb=Bb=1.0. The output video signals are therefore RED=Ro×Rb=K1×1.0=K1; GREEN=Go×Gb=K2×1.0=K2; and BLUE=Bo×Bb=K3×1.0=K3.

If, instead of opaque, a transparent attribute control bit were fed to transmission gates 32, 38, 44 in the above example, the outputs of the transmission gates will be the same as the input background signals, Rb, Gb and Bb. The amplitudes of the respective output signals would therefore be RED=K1×Rb; GREEN=K2×Gb; and BLUE=K3×Bb. The result is a background display tinted by the overlay. This result is comparable to placing a filter of the color of the overlay on top of the background display and is useful for tinting areas of the background as a field attribute without obscuring the details of the background image.

To further understand the preferred embodiment of the present application, a summary of the multiplying video mixer system of the present invention will now be made with reference to the sample applications illustrated in FIGS. *6a–6d*. Illustrated therein are a series of graphic overlay arrays displayed over video background maps. Although typical graphic displays consist of several thousand pixels, FIGS. *6a–6d* illustrate 10×10 arrays each having a total of 100 pixels. For each pixel, the digital signal generator must generate one word of computer memory. Each word is comprised of a number of bits assigned to control the red, green, and blue overlays and a number of bits assigned to control the opaque/transparent attribute of the background signal associated with that pixel.

By way of summary, let us assume that three bits of each word represent the red overlay component, three bits represent the green overlay component, and three bits represent the blue overlay component, thereby resulting in eight possible colors of each overlay component and a total of 512 different colors for the overlay signal associated with that pixel. The tenth bit of each word preferably represents the opaque/transparent attribute bit of the multiplying video mixer.

The practice of applying full screen coverage by graphical overlays of various intensities of white (red, green and blue components of equal amplitude) is useful in display systems in that it provides a method of remotely controlling display intensity by for example, a computer when the brightness control of a monitor, such as a television monitor, is inaccessible. If full screen transparent overlays of colors other than white are used, the entire background image tint will change. This is similarly useful when the tint control of the monitor is out of reach.

The multiplying video mixer system of the present invention requires a transparent full screen overlay other than black if anything is to be visible. Preferably, the normal initial condition would be a maximum white full screen transparent overlay.

As illustrated in FIGS. *6a–6d*, a 6×6 pixel red opaque window may be formed in the center of the display by setting the attribute control bits of the corresponding pixels to an opaque attribute and by having the red overlay signal go to maximum amplitude while having both the green and blue overlay signals at an amplitude of 0. This opens an opaque red window in the center 6×6 pixels of the screen in which textual or other graphical information may be displayed. If the control attribute bits of the pixels defining the window are set to a transparent attribute, only the red components of the background signals will show through the overlay since only background color components which match the color components of the transparent overlay are visible. The text overlay pixels, illustrated in FIG. *6c*, can be either opaque or transparent, although opaque is most common. FIG. *6c* shows the display after setting the attribute control bits of selected pixels representing text to an opaque attribute and displaying a blue overlay signal having a 100% amplitude and red and green overlay signals having an amplitude of 0.

A full screen transparent overlay in combination with a transparent window can be used to control the contrast between the background and overlay. The relative white levels of the area outside the window can be made less than the white level inside the window, thus increasing the contrast of the window with respect to the border. The border can be reduced to 0 (black) to eliminate the background, or can be made an opaque color to eliminate the background. If both the border and the window are either black or opaque, the background signals are not visible.

It will be apparent to those skilled in the art that various modifications and variations can be made in the apparatus and method of the present invention without departing from the spirit or scope of the invention. Other embodiments of the invention will be apparent to those skilled in the art from consideration of the specification and practice of the invention. For example, the video multipliers used in the multiplying video mixer system of the present invention need not be limited to the video multiplier described in connection with FIG. 2. Other circuit configurations having the frequency bandwidth and dynamic range to satisfy the particular requirements of a specific application may also be used. It is intended that the specification and examples described herein be considered as exemplary only, with a true scope and spirit of the invention being indicated by the following claims and their equivalents.

What is claimed is:

1. A multiplying video mixer system comprising:

a background signal generator for generating an input background signal for each of a plurality of pixels;

a digital signal generator for generating a digital word corresponding to each of said plurality of pixels, each of said digital words including at least one overlay control bit for controlling an overlay image and at least one attribute control bit for controlling an opaque/transport attribute of said input background signal;

means for converting said at least one overlay control bit into an analog overlay signal;

means for applying said at least one attribute control bit to a corresponding input background signal for outputting an analog output background signal having the opaque/transparent attribute of said at least one attribute control bit; and means for multiplying said overlay signal and said output background signal to generate an output video signal.

2. A multiplying video mixer system comprising:

a background signal generator for generating an input background signal for each of a plurality of pixels, each of said input background signals having red, green and blue components;

a digital signal generator, responsive to a user, for generating a digital word corresponding to each of said plurality of pixels, each of said digital words including at least one overlay control bit for controlling each of red, green, and blue components of a color overlay signal, and at least one attribute control bit for controlling an opaque/transparent attribute of each of said red, green, and blue components of said input background signals;

means for converting said red, green, and blue overlay control bits into red, green, and blue analog overlay signals;

means for applying said at least one attribute control bit to said red, green, and blue components of said input background signal for outputting analog red, green, and blue output background signals having the opaque/transparent attribute of said at least one attribute control bit for each of said pixels; and means for multiplying each of said red, green, and blue overlay signals with a corresponding one of said red, green, and blue output background signals to generate red, green, and blue output video signals.

3. A multiplying video mixer system according to claim 2, further comprising means for combining said red, green, and blue output video signals into a composite video signal.

4. A method of mixing video signals comprising the steps of:

generating an input background signal for each of a plurality of pixels;

generating a digital word corresponding to each of said plurality of pixels, each of said digital words including at least one overlay control bit for controlling an overlay image and at least one attribute control bit for controlling an opaque/transparent attribute of said input background signal;

converting said at least one overlay control bit into an analog overlay signal;

applying said at least one attribute control bit to a corresponding input background signal for outputting an analog output background signal having the opaque/transparent attribute of said at least one attribute control bit; and multiplying said overlay signal and said output background signal to generate an output video signal.

* * * * *